March 12, 1935.  B. R. SHOVER  1,994,290
AUTOMATIC CONTROL SYSTEM FOR ROLLING MILLS
Filed May 7, 1932  6 Sheets-Sheet 2

Fig. 2.

INVENTOR
Barton R. Shover
by his attorneys
Byrnes, Stebbins, Parmelee & Blenko

March 12, 1935.  B. R. SHOVER  1,994,290
AUTOMATIC CONTROL SYSTEM FOR ROLLING MILLS
Filed May 7, 1932   6 Sheets-Sheet 6

INVENTOR
Barton R. Shover
by his attorneys
Byrnes, Stebbins, Parmelee & Blenko

Patented Mar. 12, 1935

1,994,290

UNITED STATES PATENT OFFICE 1,994,290

AUTOMATIC CONTROL SYSTEM FOR ROLLING MILLS

Barton R. Shover, Pittsburgh, Pa.

Application May 7, 1932, Serial No. 609,831

21 Claims. (Cl. 80—31.1)

My invention relates to the control of the various elements of a rolling mill, and in particular, to a system in which the various steps in the normal sequence of operations are effected automatically in proper order.

It is clearly recognized that, for efficient operation of rolling mills and a low cost of production of the finished product, high rolling speeds and increased reductions in the thickness of the material are necessary. Increased rolling speeds and increased reductions in the material both increase the production rate and the amount of elongation which can be effected without the necessity of reheating.

The electrification of rolling mills has aided greatly in the acceleration of the process of rolling metal. In continuous unidirectional mills, production rates have been advanced to very high speeds. It has not been possible, however, heretofore to accelerate very greatly the rate of handling material in reversing or three-high mills, because of the necessity of properly synchronizing a number of different operations which must take place in an ordered sequence.

An object of this invention, therefore, is to provide means whereby the desired sequence of operations is effected automatically so as to relieve the roller-controlling the operation from handling a large number of manual controls and also to enable him to concentrate his attention upon the operation of the mill so as to reduce the rolling time to a minimum.

Under the present practice, in a two-high, sheared plate mill, the roller must control at least four individual manual controllers, levers or push buttons which control, respectively, the main mill motor with its reversal and acceleration, the screwdown motor, the front table and the rear table. In addition, the roller may also have to control an approach table, a run-out table and a dumper or pusher for placing the material on the approach or front table. In different mills, different combinations of the last mentioned pieces of equipment are employed. In a two-high blooming mill, the roller must further control the manipulator for turning the piece and aligning it for successive passes. In a slabbing or universal plate mill, the roller has to operate, instead of the manipulator, the front vertical rolls, and the rear vertical rolls, if used.

One expedient which has been resorted to in order to speed up rolling mill operation has been the use of two rollers on a single mill. This, however, increases labor costs and also results in lost time and sometimes in accidents, because the two rollers cannot always properly synchronize their actions. Another expedient is the so-called "piano keyboard" master controller, which is an attempt to facilitate to the utmost the manual operations which the roller must perform. This expedient, however, is not entirely successful because the roller has to watch each operation in order to operate his controllers at the proper time and thereby loses a material amount of time. The present invention contemplates a control system for rolling mills which will be almost entirely automatic, so that no rolling time is lost and production is accelerated to the maximum degree, with minimum power consumption and wear on the equipment.

In describing the invention, it will be explained as applied to a two-high universal plate mill, although it may be readily utilized to control a three-high mill. The system as described herein may also be applied practically without material change to a slabbing mill or a blooming mill.

A universal plate mill generally comprises a stand of horizontal reducing rolls, having front and rear conveyor tables on opposite sides thereof for passing the material back and forth through the mill, vertical or edging rolls, screwdowns for the horizontal and vertical rolls, a manipulator and an ingot pusher.

In accordance with my invention, I provide a system for automatically controlling the sequence of operations of the aforementioned elements of the usual plate mill. Means responsive to the raising of the top horizontal roll to its uppermost position operates the ingot pusher to place an ingot on the front table. The vertical rolls and manipulator are automatically set to the proper spacing and the main roll motor is decelerated automatically to the proper entering speed for the first pass. The front and rear tables operate under the control of a main controller when all the preliminary adjustments have been completed.

The operation of the main controller starts the tables and when the piece enters the main rolls, the main roll motor is accelerated. As the piece emerges from the rolls, the main roll motor is decelerated. The passage of the piece through the mill automatically sets the main roll screwdowns for the second pass and retracts the vertical rolls and the manipulator. The tables are stopped by the starting of the screwdown motor.

The main controller is effective for reversing the main roll motor and the completion of the adjustment of the main roll screwdown accelerates the main roll motor to the proper speed for the second pass. This is done because the speed at which the rolls will bite the piece is fixed for a given roll diameter and thickness of the piece, as well as the amount of reduction to be made, and is usually different for each passage of material through the rolls. The reversal of the tables by operation of the main controller carries the piece through the mill for the second pass and the above described cycle may be continued as desired.

I prefer to employ sectionalized front and rear tables and to provide automatic means for bringing the extreme portions of the tables into operation only for such portion of the rolling cycle as the piece is long enough to require their use. It is thus unnecessary to operate the entire length of the tables throughout the rolling cycle. A saving in power requirements and wear on the tables is thus effected. Automatic means for bringing the table extension into operation are provided. The speed of the tables is automatically synchronized with that of the main roll motor.

The invention includes automatic means for controlling the screwdown motor to obtain the proper screwdown settings. Adjustable contacts operated by the screwdown drive determine the adjustment of the rolls for each pass of the material and, after the last pass, the screwdown motor is operated to raise the upper roll automatically to the proper position for the first pass of the next piece.

A separate motor is provided for driving each of the vertical rolls but the two motors may be subject to the same control. The vertical rolls are always driven in the same direction and are retracted from engagement with the piece when the latter is reversed. Adjustable contacts similar to those controlling the main screwdowns determine the adjustment of the vertical rolls for the different passes.

The manipulator is controlled in synchronism with the vertical rolls so that it positions the piece before it starts through the rolls on each forward pass. The manipulator is retracted on reverse passes of the piece.

An ingot dumper or pusher may be employed to place the piece on the front table for the first pass. An automatic control for the ingot dumper is provided, which insures the proper sequence of operations.

An approach table may be used instead of the ingot pusher and, if used, will also be automatically controlled in the same manner as the dumper or by the motion of the dumper itself. The approach table serves to bring the piece from an ingot buggy or other delivery apparatus to the front table extension, from which it is passed on to the front table for delivery to the rolls. The approach table, which is ahead of the front table extension, may also be used as a part of the latter when finishing long pieces and when so used, corresponds to a front table extension.

A run-out table may be provided for taking the finished material from the rear mill table for delivering it to a shear, hot bed, or other table. The run-out table can be automatically controlled or under the manual control of an operator.

In order to prevent interruption of operation in case of failure of the automatic system, I provide manual controls for each of the various pieces of equipment and the circuits and controllers are arranged so that operation of the manual control mechanism renders the automatic system inoperative as to that particular piece of equipment. Release of the manual control, however, restores the apparatus to automatic control.

In the normal sequence of operations, at the beginning of the working cycle of a given piece, the top roll is being raised to the proper position for the first pass, the main rolls are running at the proper biting speed for the first pass, the vertical rolls and manipulator are set for the first pass and the front and rear tables are at rest. The main control lever is in the forward position. When an ingot or other piece has been delivered to the ingot pusher by any suitable means, the top roll starts upward and the pusher advances the ingot to the front table in alignment with the manipulator and vertical rolls. With the main controller in forward position, the tables start automatically when the top roll reaches its upper position and advance the piece to the manipulator, which guides its entry to the vertical rolls which deliver it to the main rolls.

After the piece enters the main rolls, the main roll motor is automatically accelerated toward its maximum speed. The speed of the table rolls is also accelerated. As the piece leaves the rolls, the screwdown motors automatically lower the top roll to its setting for the second pass and the tables stop. The main roll motor is manually reversed and automatically accelerates to the proper entering speed for the second pass, and the vertical rolls and manipulator are moved away from the center of the mill a predetermined amount. The speed of the table motors is automatically synchronized with that of the main rolls.

The foregoing cycle continues until the reduction and elongation have been carried to the desired extent. When the piece is sufficiently elongated, the extension tables are automatically made operative in synchronism with the front and rear tables.

After the last pass through the mill, the tables stop and the main roll motor decelerates to the entering speed for the first pass. The top roll is raised to the proper setting for the first pass and the pusher advances the next piece on to the front table. The finished piece may be carried away by the run-out table under manual or automatic control.

For a complete understanding of the invention, reference is made to the accompanying drawings illustrating a present preferred embodiment, although it is to be understood that numerous changes in the invention as disclosed may be made without departing from the scope of my broader claims.

*General description of mill equipment*

Figures 1, 7:
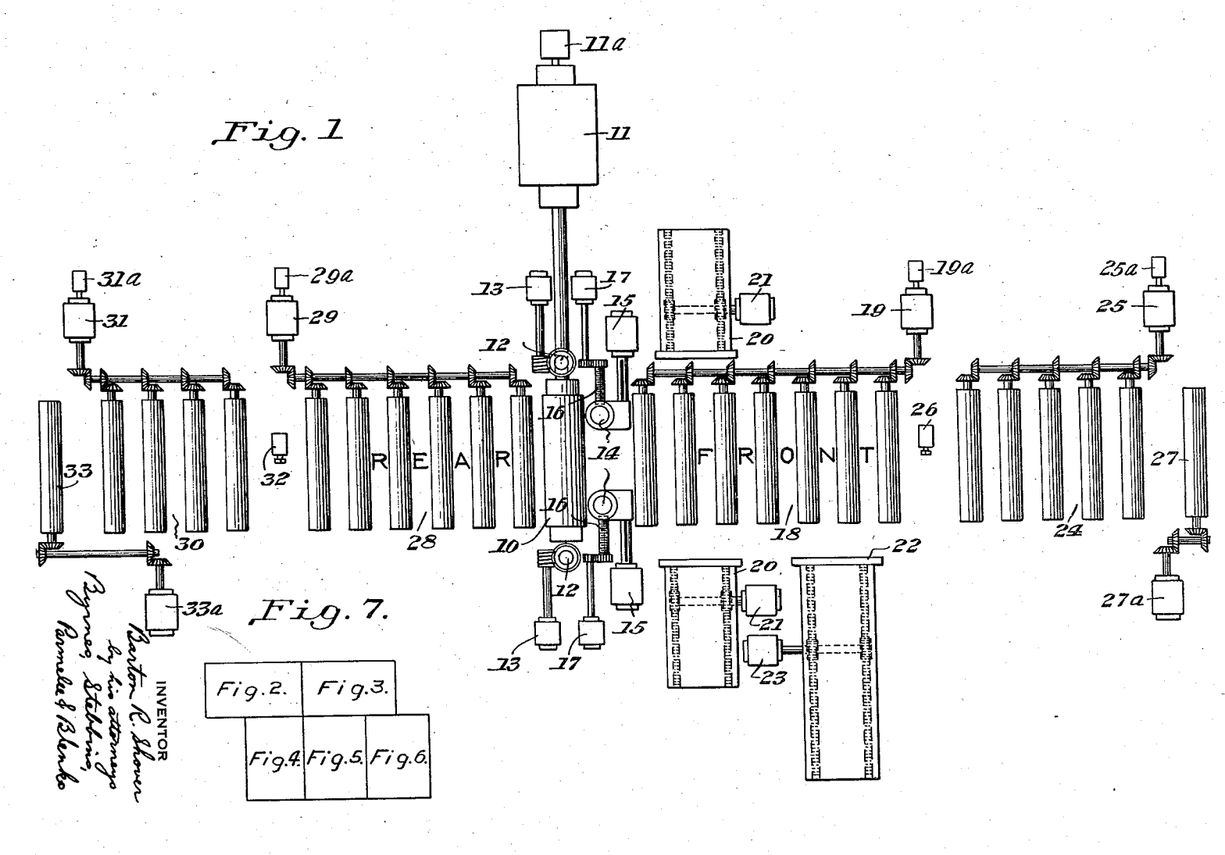
Figure 1 is a schematic view showing the layout of a universal plate mill adapted to be controlled by my system.
Figure 7 is a diagrammatic view showing how Figures 2 through 6 of the drawings should be arranged to constitute a complete system with all portions properly interconnected.
Figure 2:
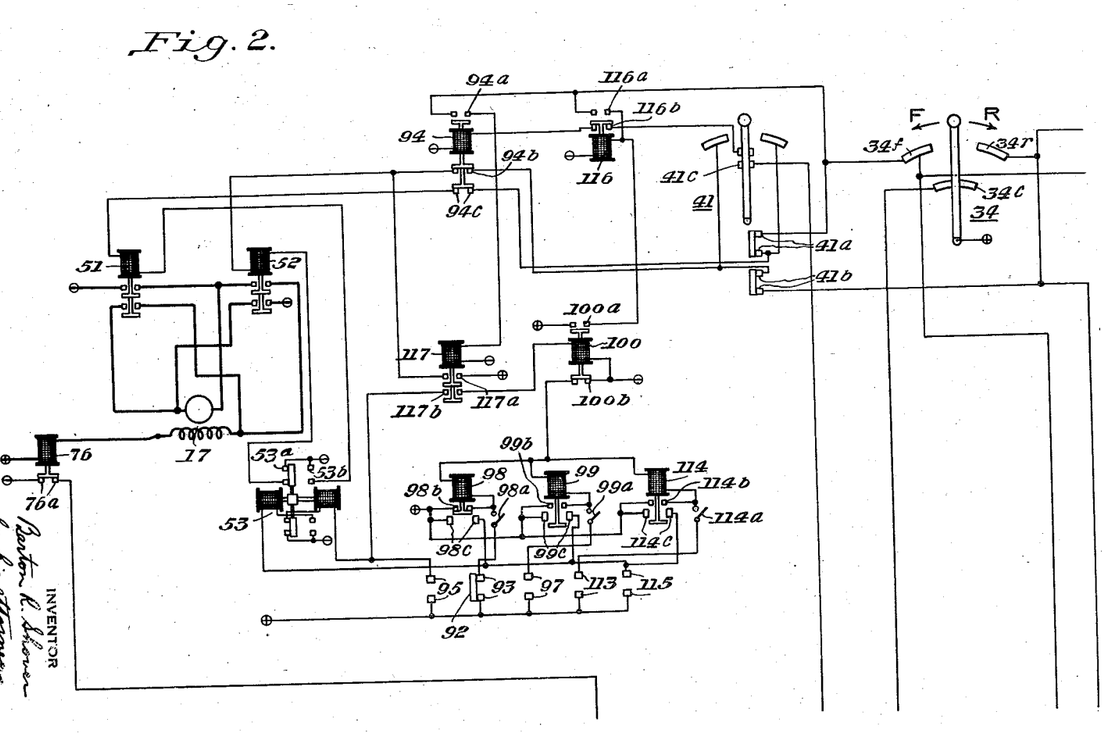
Figure 2 is a circuit diagram showing the control for the manipulator and the vertical roll.
Figure 3:
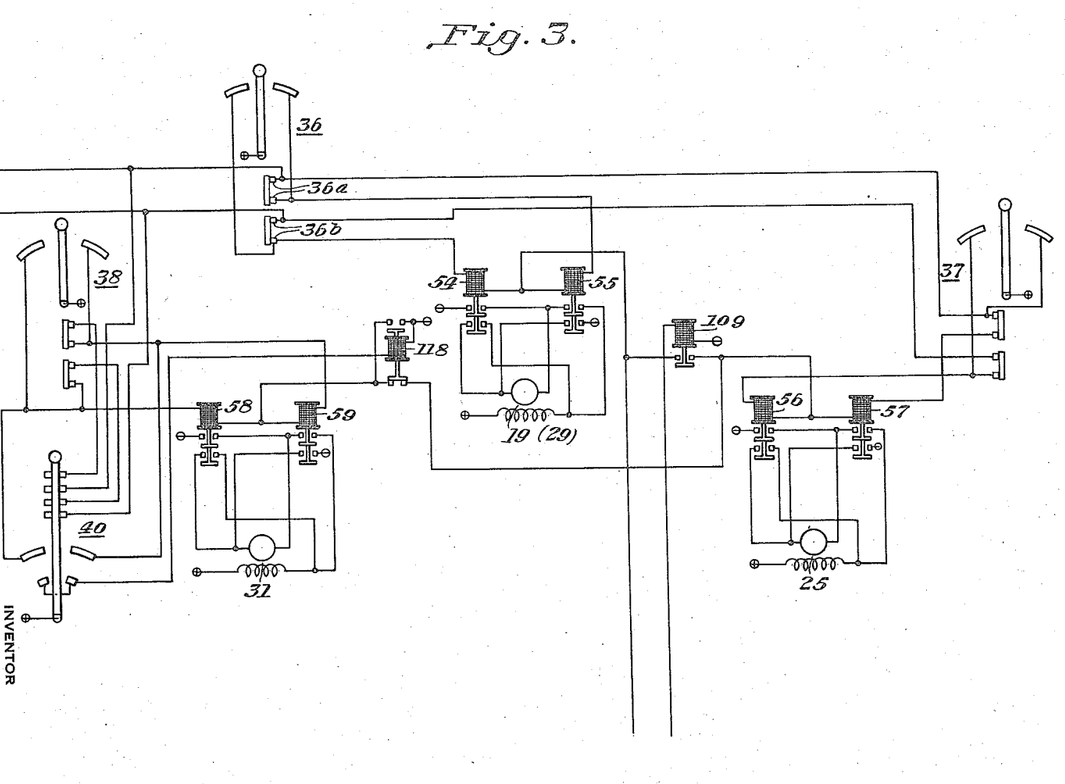
Figure 3 is a circuit diagram illustrating the control of the front and rear tables.

Referring now in detail to the drawings and, for the present, to Figure 1 in particular, the universal plate mill shown in Figure 1 comprises main rolls 10 having a reversing motor 11 for driving them. Screwdowns 12 driven by motors 13 adjust the position of the top roll with respect to the bottom roll. Vertical rolls 14 are driven by motors 15 mounted to travel therewith, and are adjusted laterally by means of screwdowns 16 driven by motors 17. On the entering side of the mill is located a front table 18 driven by a motor 19. Manipulator arms 20 are extensible and retractible over the front table 18 adjacent the vertical rolls 14 by motors 21. An ingot pusher 22 driven by a motor 23 is located adjacent the end of the front table for advancing an ingot to the table from one side thereof. A front extension table 24 is driven by a motor 25. A flag switch 26 or its equivalent, located between the front table and the front extension table, may be used to bring the latter into operation when the piece being worked is sufficiently elongated to actuate the flag switch. An approach table 27, if used, is driven by a motor 27a.

On the rear side of the mill, a rear table 28 is located and is driven by a motor 29. A rear extension table 30 is driven by a motor 31 and the operation of the rear extension table may be controlled by a flag switch 32 or its equivalent. A run-out table 33 is driven by a motor 33a.

*General description of electrical equipment*

Referring now more particularly to Figures 2 through 6 illustrating the circuit diagram of the system of my invention, the motors driving the different pieces of equipment are designated in the circuit diagram by the same numerals as on the layout shown in Figure 1. In order to avoid complicating the diagram, where several motors are controlled simultaneously, for example, the motors driving the vertical roll screwdowns, only one motor is shown in the diagram, it being understood that the other motor is similarly controlled either by the same control apparatus or a duplicate thereof. Similarly, in the case of the manipulator motors which are controlled in exact synchronism with the vertical roll screwdown motors, and the motors for the front and rear tables which, of course, are started and reversed simultaneously.

The roller's main control lever is indicated at 34. The auxiliary manual control lever for the main motor and screwdown is shown at 35. The manual controller for the table motors is illustrated at 36 and the manual controllers for the front and rear extension tables at 37 and 38, while the manual controller for the ingot pusher is shown at 39. A manual controller 40 for the rear extension table is provided preferably at the hot bed so that movement of the finished material thereto can be properly governed. A manual controller 41 is provided for the vertical roll screwdowns. Below each of the manual controllers 35, 36, 37, 38 and 41 are shown a plurality of contacts which are closed when the controller is in neutral position but which are opened when the controller is moved in either direction.

In order further to simplify the circuit diagram and to eliminate unnecessary complication, I have not shown complete circuits extending to the source of energy from all the control elements. Connections to opposite sides of the main and control busses are indicated by plus and minus signs. The various motors, furthermore, are indicated as being controlled simply by forward and reverse contactors without the usual accelerating relays. The latter, of course, are standard equipment and would be incorporated in the known manner in any system embodying the invention. A brief description of a portion of the auxiliary control apparatus will first be given and then a detailed description of the normal operating sequence, with specific mention of every auxiliary device involved.

The main mill motor 11 is supplied with current from a generator 42. The circuit between the motor and the generator includes reversing and accelerating relays 43 and 44. For reversing the motor, I reverse the excitation of the generator 42 by means of a field reversing contactor 45. The accelerating relays for the main motor are shown and will be described in detail in the proper place.

The screwdown motor 13 has forward and reverse contactors 46 and 47. These contactors are controlled by a screwdown reversing relay 48. A relay 49 controls a main line contactor 50 in the circuit of the screwdown motor for starting and stopping the latter between passes. The vertical roll screwdown motor 17 is controlled by forward and reverse contactors 51 and 52. These contactors are controlled by a reversing relay 53.

The front and rear table motors 19 and 29 are controlled by forward and reverse contactors 54 and 55. Similar contactors 56, 57 and 58, 59, control the front extension table motor 25 and the rear extension table motor 31.

The pusher motor 23 is controlled by forward and reverse contactors 60 and 61. These contactors are in turn controlled by a reversing relay 62.

The relays 45, 48, 49, 53 and 62 are all of the same type. They carry a pair of moving contacts for bridging pairs of fixed contacts in either extreme position of the moving element. Two operating coils for the relay are provided for shifting its moving contacts back and forth and the circuits of the actuating magnets are controlled by the contacts themselves, the construction of the relays being such that when one of the coils thereof has been energized, the moving element of the relay will be actuated from its then extreme position to the other, even though the circuit for the operating coil is opened on movement of the movable contacts.

With the foregoing brief description of the apparatus involved in the various circuits, I shall now proceed to a detailed description of the actual sequence of operations, describing the remainder of the auxiliary control equipment in the process. In describing the sequence of operations, a certain set of initial conditions will be assumed and the complete cycle described starting from that point. The completion of the cycle of operations, it will be found, restores the conditions initially assumed. The remaining auxiliary apparatus, including relays and contactors, is illustrated conventionally. The armatures and contacts of all relays and contactors are shown in the positions they occupy under the assumed initial conditions.

The establishment of initial conditions

As above stated, the description of the operation will proceed upon the assumption that initially the main roll motor 11 is running at the entering speed for the first pass of the piece of material through the mill. At the same time, the vertical rolls and the manipulator arms will be adjusted to give the proper opening to admit the piece for the first pass. At this time, the top roll is being raised, the tables are at rest, and the pusher is withdrawn. The ingot is placed in position in front of the pusher. All manual controllers are in neutral position.

The establishment of the initial conditions assumed requires the raising of the top roll by the screwdown motor 13. While this operation is going on, a series relay 63 in the circuit of the screwdown motor is energized to complete a circuit, including the front contacts of the relay 63, contacts 64 of the manual controller 35 which are bridged when the latter is in neutral position, contacts 65 which are bridged when the manual controller 39 is in normal position, the operating coil of contactor 60 and contacts 62c of relay 62, which are bridged by the moving contact in the initial position of the relay as illustrated. In describing control circuits, no reference will be made to the source of supply, which will be indicated by the plus and minus signs at opposite ends of the circuit traced in detail.

Ingot pusher operation

When the raising of the top roll starts, the ingot pusher is in retracted position so that a moving contact 67 actuated by the pusher bridges fixed contacts 68. The contactor 60 operates to energize the motor 23 to drive the pusher forward. The pusher advances the ingot or slab in front of it toward the front table 18. The extremity of the forward movement of the pusher is determined by the engagement of the bridging contact 67 which moves with the pusher drive, with fixed contacts 69. On the occurrence of this condition, the right-hand operating coil of the relay 62 is energized to open the circuit of the contactor 60. Contacts 62a and 62b of the relay 62 control the circuits of the right and left-hand operating coils thereof so that when the moving contact is in one extreme position, a circuit is prepared for the coil which is effective to shift it to the other extreme position. On the energization of said coil, its circuit is broken and a circuit prepared for the coil effective to produce the reverse movement of the relay contacts.

The opening of the circuit of the contactor 60 stops the pusher motor 23. The ingot or piece to be rolled is now positioned on the front table in alignment with the manipulator arms and the vertical rolls so as to pass freely therebetween when the table starts. It will be understood that the manipulator arms do not grip the piece tightly but are designed merely to position it generally in alignment with the center line of the mill. In fact, the cable connections usually employed, instead of the rack and pinion shown, between the manipulator arms and the actuating motors, have ample slack to permit ready passage of the piece between the manipulator arms. The manipulator arms, of course, guide the piece between the vertical rolls which exert considerable pressure on the edges of the piece.

When the screwdown motor 13 has raised the top roll to its extreme upper position, a moving contact 70 actuated by the screwdown drive engages fixed contacts 71. A relay 72 is thereby energized to connect instantaneously a fixed contact 72a of the relay with a moving contact 72b. The contact 72b is what I call a "crab claw" contact, and is pivoted and counterbalanced. The construction is such that the engagement of the contact 72b by the armature of the relay 72 throws the contact out of the path of the armature so as to break the circuit instantaneously established. The counterbalanced arm of the contact maintains it in such position until the armature of the relay drops and restores the contact to the position illustrated. The instantaneous connection of contacts 72a and 72b completes a circuit including contacts 71, 72a, 72b, contacts 73, normally bridged by a moving contact when the manual controller is in neutral position, the right-hand operating coil of the relay 49 and the lower left-hand contacts of said relay, which I shall hereafter designate as the cut-off contacts without the use of a specific reference numeral. The relay 49 thereupon shifts from its normal left-hand position to the right-hand position, opening contacts 49a. The opening of contacts 49a deenergizes the contactor 50 which is energized under the initial conditions assumed. The contactor 50 opens its front contacts 50a, to open the circuit for the screwdown motor 13 which thereupon stops. The opening of the screwdown motor circuit debut this circuit has already been opened at contacts 63a, opens the circuit of the contactor 60, but this circuit has already been opened at contacts 62c by the operation of relay 62 resulting from the bridging of contact 69. At its back contacts 50b, the contactor 50 prepares a circuit for the contactor 54 controlling the motors 19 and 29, but this circuit is not completed until the roller throws the main control lever 34 to the forward position.

While the foregoing operations are being effected, the armature of the relay 72 connects its contact 72a to a fixed contact 72c, completing a circuit for the right-hand operating coil of relay 48. The circuit includes contacts 71, 72a, 72c, the right-hand coil of the relay 48 and the cut-off contacts thereof. The moving contacts of the relay 48 move from their normal left-hand position toward the right. This movement, at contacts 48a, opens the circuit for the raising contactor 46 of the screwdown motor 13. This circuit includes contacts 74 which are bridged while the controller 35 is in normal position. The subsequent deenergization of the contactor 46 opens the raising circuit of the motor 13 but the motor is already stopped as a result of the opening of contacts 50a of the contactor 50. The closing of the contacts 48b completes a circuit for the lowering contactor 47 of the screwdown motor 13, including normally closed contacts 75 on the controller 35. The circuit of the motor 13, however, is open at contacts 50a so that the motor does not start at this time. The closing of contacts 48b also completes a circuit to the reversing contactor 61 of the pusher motor 23, which includes contacts 62d of the relay 62. The pusher is thereupon retracted to the outer limit of its movement determined by the position of the contacts 68. When the latter are bridged by the contact 67 which moves in accordance with the movement of the pusher, a circuit is completed for the left-hand coil of the relay 62. The completion of this circuit operates the relay 62 to open the contacts 62d and deenergize the reversing contactor 61 of the pusher motor. The pusher is thus withdrawn and circuits are prepared for advancing it when the relay 63 is again energized by subsequent reversing of the screwdown motor 13. It will be noted that the relay 63 is not included in the forward or downward circuit of the screwdown motor 13 but only in the reverse or upward circuit. It will be apparent that the above described cycle is repeated every time the screwdown motor raises the rolls to their top position after finising a piece.

The manual controller 39 for the pusher motor 23 controls the forward and reverse contactors 60 and 61 thereof directly. Movement of the controller 39 in either direction, however, prevents automatic advancement of the pusher although automatic retraction thereof is not interferred with.

*First pass—Table starting*

The piece to be rolled has now been placed on the front table and the pusher withdrawn. The next step is the starting of the tables to forward the piece to the rolls. This is accomplished by the roller who, when he sees from the pulpit that the ingot is in proper position for rolling, throws his main control lever 34 from the neutral position to the forward position. The engagement of the lever 34 with its forward contact 34f completes a circuit through said contact, contacts 36b of the controller 36, the forward contactor 54 of the table motors, the back contacts 50b of the relay 50, back contacts 44c of relay 44 and the back contacts of a series relay 76 in the circuit of the vertical roll screwdown motor 17. It will thus be seen that the starting of the table motors is dependent upon the stopping of the main screwdown motor, the absence of reversal or accelerating current in the circuit of the main motor 11, measured by the relay 44, and the deenergization of the relay 76 indicating that the manipulator and vertical rolls have been adjusted and the motor 17 stopped. If all these conditions are fulfilled, the contactor 54 is energized and the motors 19 and 29 are started to advance the ingot to the rolls.

Since the ingot is aligned with the manipulator arms by the pusher, it passes therethrough and engages the vertical rolls. The vertical roll motors 15, as well as the front and rear table motors, are preferably controlled by known means (not shown) so that their speed bears a constant relation to that of the main motor. The peripheral speed of the vertical and horizontal rolls may thus be equalized. The vertical rolls may be stopped by suitable means between forward passes of the piece or may be permitted to run continuously.

*Main motor acceleration (during first pass)*

Under the conditions assumed initially, the motor 11 is running at its minimum speed when the ingot is started toward the rolls. For such minimum speed, the excitation of the motor 11 should be a maximum and that of the generator 42 a minimum. The means by which these conditions are obtained will be explained hereinafter. As the piece engages the rolls at the first pass, the increase in load on the motor 11 causes an increase in the main motor current supplied by the generator 42. This increase in motor current operates the relays 43 and 44. The operation of the relay 44 closes a contact 44a and resets counterbalanced crab claw contacts 44b for instantaneous reclosure when the relay is deenergized. The relay 43 closes contacts 43a and a circuit is thereby completed for an accelerating relay 77, the circuit including the contacts 44a and 43a. The relay 77 operates and closes its contact 77c to shunt a portion of a rheostat 42r in series with the field winding 42f of the generator 42. The circuit of the field winding of the generator 42 is completed through the contacts of the field reversing contactor 45, the operation of which will be described later.

The closing of contacts 77b locks the accelerating relay 77 in operative position independently of contacts 43a. The closing of contacts 77a completes a circuit for energizing the winding of a second accelerating relay 78. The contacts 78c being closed by the operation of the relay, shunt the rest of the rheostat 42r. Successive increases in the excitation of the generator 42, of course, increase the voltage applied to the motor 11 and therefore accelerate the main rolls. The closing of contacts 78b lock the relay 78 in independently of the relay 43.

The closing of contacts 78a completes a circuit for energizing a third accelerating relay 79. This relay opens contacts 79c to insert a portion of a field rheostat 11r in circuit with the field winding 11f of the motor 11. The closing of contacts 79b locks the relay in and the closing of contacts 79a operates a fourth accelerating relay 80. The relay 80 opens contacts 80a to insert the rest of rheostat 11r in circuit with the field winding 11f. The motor 11 is thus accelerated by two successive increases in the voltage of the generator 42 and two successive decreases in the excitation of the motor 11. The motor 11 thus attains its maximum speed very shortly after the piece enters the rolls. The first pass is then completed at the maximum speed and the piece passes out from the rolls on to the rear table 28.

*Screwdown adjustment and acceleration of main motor for second pass*

As the piece leaves the rolls, the load on the motor 11 is reduced and the reduction in current supplied thereto deenergizes the relays 43 and 44. The accelerating relays 77, 78, 79 and 80 are deenergized by the opening of contacts 44a and the motor 11 is decelerated to its initial speed. As the armature of the relay 44 descends, it closes contacts 44b instantaneously although these contacts, being of the crab claw type, swing open almost immediately. During this time, however, a circuit is completed including contacts 81 of the manual controller 35 for the left-hand winding of the relay 49. The operation of the relay 49 closes contacts 49a to energize contactor 50. The contactor 50 on operating opens contacts 50b to deenergize the forward contactor 54 for the table motors. The tables therefor come to rest and the piece remains stationary on the rear table. The contactor 50 also closes contacts 50a to start the screwdown motor in the downward direction, the downward contactor 47 having been previously energized by the operation of the relay 48 to its right-hand position.

The tables having been stopped and the screwdown motor started, everything remains unchanged until the contact 70 actuated by the screwdown drive bridges contacts 82 and the roller reverses the main controller 34. A normally deenergized relay 83 is thereby energized but its operation does not perform any function at this time. Further movement of the contact 70 bridges contacts 84. These contacts are adjusted so that they are bridged by the contact 70 when the top roll has been lowered to the proper setting for the second pass of the piece between the rolls. The bridging of the contacts 84 energizes a relay 85. The energization of the relay 85 opens a normally closed circuit including the contacts 85d thereof and the winding of a contactor 86. The opening of the contacts 85d deenergizes the contactor 86 which closes its contacts 86a to shunt a portion of the rheostat 42r. This increases the excitation of the generator 42. The voltage of the generator is likewise increased and the motor 11 is thereby accelerated to the proper speed for entering the piece between the rolls on the second pass. The operation of the relay 85 also bridges contacts 85a and 85c. The bridging of these contacts completes a circuit including back contacts 63b of relay 63, contacts 73 and the right-hand winding of the relay 49. The operation of the relay 49 opens contacts 49a and this deenergizes contactor 50. The circuit of the screwdown motor 13 is thus opened at contacts 50a so that no further lowering of the top roll occurs for the time being. At contacts 50b, the contactor 50 sets up a circuit for the reversing contactor 55 of the table motors but this circuit is not completed until the roller actually reverses his main control lever 34.

The relay 85 also bridges contacts 85a and 85b, to complete its own locking circuit including the back contacts of relay 83.

*Second pass—Main motor reversal*

All is now ready for the reversal of the piece, which is effected by shifting the main control lever 34 from forward to reverse position. This operation is effective to reverse the main motor by reversing the excitation of the generator and also to reverse the roll tables when the reversal of the main rolls has been accomplished. As the lever 34 is shifted from its forward to its reverse position, it engages a contact 34c for a short time. A circuit is thus completed for a solenoid 87 forming part of the relay 44. The solenoid 87 is linked to a reciprocable contact bar 88 normally maintained in the position shown by a spring 89. The bar 88 has a hole 90 therein for passage of a collar 91 on the armature of the relay 44. Under normal conditions, the bar 88 bridges contacts 44c and the hole 90 therein is in alignment with the collar 91 so that free reciprocation of the armature of the relay 44 is permitted. By the reversal of the controller 34, the solenoid 87 is energized as described to pull the bar 88 over so that the collar 91 will not pass through the hole 90. The relay 44 is deenergized, of course, when the solenoid 87 is energized. If it were not for the locking effect of the movement of the bar 88, the relay 44 would operate on the current supplied to the main motor for reversing it and tend to reset the main roll screwdowns, as already described. The solenoid 87, however, together with the relay 44, comprises a device which is responsive to the load current supplied to the motor during the pass, for controlling the screwdowns, but which is locked out by reversal current drawn by the motor and thereby prevents screwdown operation on reverse current and also precludes reversal of the tables until the motor-reversal current dies away.

With the solenoid 87 energized, the roller reverses his lever and engagement of the controller 34 with its reverse contact 34r completes a circuit through said contact to the right-hand operating coil of the field reversing contactor 45. The resulting opening of the contacts 45a and closing of the contacts 45b reverses the field winding 42f in the excitation circuit of the generator 42. The generator immediately supplies reversing current to the motor and this reversing current energizes the relays 43 and 44. The relay 43 operates to close contacts 43a but the relay 44, being locked out by the bar 88, cannot close its contacts 44a nor reset its contacts 44b. When the relay 44 is energized, however, the collar 91 on its armature engages the bar 88 and lifts it upward to connect contacts 44f, 44d, and 44e. This movement is not sufficient to reset the contacts 44b controlling the screwdown and thereby precludes such operation as long as the motor is drawing reversal current. The connection of contacts 44f and 44d operates the accelerating relays 77, 78, 79 and 80, as already described, to effect reversal of the motor 11 in the shortest possible time. The relay 77 has no effect because of the previous deenergization of contactor 86. The connection of contacts 44f and 44e locks the solenoid 87 so that its energization is no longer dependent on the engagement of the controller 34 with its central contact 34c.

When the main motor 11 has been reversed and accelerated to proper speed for the second pass, the relays 43 and 44 drop their armatures as the motor current decreases to the idling value. The motor continues to run at the entering speed for the second pass. Since the contacts 44b were not reset by the limited upward movement of the armature of the relay 44, they are not engaged on lowering of the armature after the motor has reversed. This does open the circuit for the solenoid 87 and the accelerating relays, and the bridging of the contacts 44c restores the circuit for the reversal of the table motors. This circuit extends from the controller 34 through contact 34r, contacts 36a of the controller 36, the reversing contactor 55 of the table motors through the back contacts of relay 50, the contacts 44c of relay 44 and the back contacts of relay 76 when the latter are closed. The table motors, therefore, cannot reverse until the main motor has reversed, the main screwdown been adjusted and the vertical roll screwdowns operated properly.

The speed of the table motors is controlled in accordance with that of the main rolls so that for the second pass, the tables operate at a higher speed than for the first. Any suitable means may be provided for maintaining a predetermined relation between the speeds of the main rolls and the table rolls. One example of such means is disclosed in "The Iron Age" for April 21, 1932 at page 930, although other means may, of course, be employed. In Figure 1 of the drawings, the table-synchronizing means is indicated at 11a, 19a, 25a, 29a and 31a. The operation of the vertical roll screwdowns after the first pass and preparatory to reversal will now be described.

*Vertical roll screwdown adjustment and table reversal for second pass*

During the first pass, a moving contact 92 actuated by the vertical roll screwdown drive bridges fixed contacts 93. At that time, as previously stated, the vertical rolls are adjusted for the first pass. When the roller throws the main control lever to the reverse position, a circuit is completed through contact 34r, contacts 41b on the controller 41, back contacts 94b of a relay 94, the winding of the reversing contactor 52 of the vertical roll screwdown motor 17, and contacts 53a of relay 53. On the resulting operation of the screwdown motor 17 to withdraw the vertical roll housings, the contact 92 moves back into engagement with contacts 95. This position of the contact 92 corresponds to the extreme retracted position of the vertical roll housings. By the bridging of contacts 95, a circuit is completed for the right-hand coil of the relay 53 which operates immediately and prepares a circuit for the forward contactor 51 of the motor 17. This circuit is not completed, however, until the roller reverses his control lever for the third pass. At the same time, the circuit for the reversing contactor 52 is opened and the motor is stopped. The relay 76 is thereby deenergized and the previously described circuit for the reversing contactor 55 of the table motors is completed at contacts 76a.

*Second pass—Main motor acceleration and deceleration—Screwdown adjustment*

As the tables start up in the reverse direction, the piece is fed through the rolls for the second pass. As the piece engages the rolls, the current supplied to the motor increases so as to operate relays 43 and 44. These relays accelerate the main motor 11, as previously described, so that the second pass is completed at maximum rolling speed. As soon as the piece is through the mill, the relays 43 and 44 release their armatures and the motor speed is reduced to the entering speed for the second pass. The release of the armature of relay 44 closes contacts 44b to complete the circuit for the left-hand coil of relay 49. The operation of this relay energizes relay 50. The tables are thereby stopped and the screwdown motor 13 is started to lower the top roll into position for the third pass. As the screwdown motor operates, the contact 70 leaves the contacts 84 and approaches contacts 96. The relay 85, however, is locked up through the back contacts of relay 83.

*Third pass—Main motor reversal*

When the roller observes that the piece has completed the second pass, he reverses his main controller 34. The contactor 55 is thereby deenergized to stop the table motors 19. As the controller 34 is reversed, the circuit for the solenoid 87 is completed so that the locking bar 88 is actuated to prevent complete operation of the relay 44. Further movement of the controller completes a circuit for the left-hand operating coil of the field reversing contactor 45 which is thereby restored to its initial position. This again reverses the connections of the field winding 42f so that the generator 42 supplies reversing current to the motor 11. The relays 43 and 44 operate as previously described to accelerate the reversal of the motor 11.

*Vertical roll screwdown adjustment for third pass*

While the reversal of the main motor is going on, the adjustment of the main roll screwdown continues and the adjustment of the vertical roll screwdown is effected. The latter is accomplished by the energization of the forward contactor 51 of the vertical roll screwdown motor 17, by the completion of a circuit including the contact 34f of the controller 34, contacts 41a of the controller 41, contacts 94c of the relay 94, the coil of the contactor 51 and contacts 53b of the relay 53. The vertical roll housings are moved inwardly until the contact 92 engages contacts 97. The contact 92 bridges the contacts 93 for an instant during its movement but this has no effect since relay 98 controlled by contact 93 is already energized and locked up, as will be explained hereinafter. The bridging of contacts 97 energizes a relay 99, a manual switch 99a in the circuit thereof being normally closed. The circuit for the relay 99 includes back contacts of a relay 100. The operation of the relay 99 completes a circuit, including contacts 99c for the left-hand coil of relay 53, which is immediately operated to deenergize the contactor 51 and stop the motor 17. The vertical rolls are thus adjusted properly for the third pass. The manipulator arms are likewise operated to straighten and position the piece on the tables. The relay 99 completes its own locking circuit at contacts 99b.

*Acceleration of main motor and starting tables forward for third pass*

The continuance of the main roll screwdown operation causes the contact 70 to bridge contacts 96, but this produces no result other than the instantaneous operation and subsequent release of the relay 101. The contact 70 next engages contacts 102 to energize a relay 103. The operation of the relay 103 opens its normally closed contacts 103d to deenergize a normally energized contactor 104. The deenergization of the contactor 104 shunts another section of the rheostat 42r in series with the field 42f of the generator 42. This increases the generator voltage and accelerates the motor 11 to the proper speed for the entrance of the piece in the third pass through the mill.

The relay 103 subsequently connects contacts 103a and 103c completing a circuit for the right-hand operating coil of the relay 49 to deenergize the relay 50 and stop the screwdown motor 13. The relay 50 at its back contacts 50b prepares a circuit for the reversal of the table motors, which is completed as soon as the reversal of the main motor 11 has been accomplished and the contacts 44c of the relay 44 again bridged by the contact bar 88. The relay 103 then connects the contacts 103a and 103b, locking the relay in operated position. As soon as the contacts 44c are closed, the forward contactor 54 of the table rolls is energized since the lever of the controller is again in the forward position.

Acceleration and deceleration of main motor during third pass

The table motors start in the forward direction and advance the piece to the rolls, whereupon the main motor is accelerated in the manner already described and decelerated when the piece is through the mill.

Main and vertical screwdown adjustment and main motor reversal for fourth pass On the completion of the third pass, the contacts 44b are bridged and the relay 49 and contactor 50 are operated to operate the main screwdown to set the top roll for the fourth pass. The roller reverses his main control lever and thus brings about the reversal of the generator field 42f by means of the contactor 45 and the subsequent reversal of the main motor 11, as already described. At the same time, a circuit is completed for the reversing contactor 52 of the vertical roll screwdown motor 17. The contact 92, therefore, backs off the contacts 97, passes the contacts 93 and engages the contacts 95. The bridging and opening of the contacts 97 and 93 by the contact 92 has no effect since the relays 98 and 99 are both locked up. The engagement of the contact 92 with the contacts 95, however, operates relay 53 to deenergize the reversing contactor 52 and stop the screwdown motor 17.

Acceleration of main motor for fourth pass

The operation of the main screwdown motor 13 actuates the contact 70 into engagement with contacts 104 for instantaneously energizing a relay 105 similar to relays 83 and 101. Subsequently, the engagement of the contact 70 with contacts 106 operates a relay 107. This relay is somewhat similar to relays 85 and 103. It first opens, at its back contacts 107d, the circuit of a normally energized contactor 108. The deenergization of the contactor 108 opens a shunt around a portion of the field rheostat 114 of the motor 11 to accelerate the latter to the entering speed for the fourth pass. Further operation of the relay 107 connects its contacts 107a and 107c to operate the relay 49, deenergize the contactor 50, and stop the screwdown motor 13. The relay 107 then locks itself up through its contacts 107a and 107b and the back contacts of relay 105.

Operation of extension tables

In the present system, it is assumed that after the third pass, the piece will be sufficiently elongated to require operation of the extension table. When the main rolls are set for the fourth pass, therefore, the contact 70 completes the circuit through contacts 106 for a relay 109. Thus, when the main motor has been reversed for the fourth pass, the main screwdown properly adjusted and the vertical screwdown retracted, the usual circuit for the reversing contactor 55 of the table motors is completed through the roller's control lever 34 and contact 34r. At the same time, the reversing contactors 57 and 59 of the front and rear extension table motors 25 and 31 are energized. The piece is then returned to the rolls for the fourth pass. The flag switches 32 and 26 or photocells may be used similarly to operate the extension tables only when the piece has been sufficiently elongated.

Screwdown adjustment after fourth pass

After the piece has entered the rolls, the main motor is accelerated and, as the piece leaves the rolls, the contacts 44b of the relay 44 are closed instantaneously. In the manner previously described, this operates the relay 49 and the contactor 50 to start the screwdown motor 13.

Main motor reversal and acceleration for fifth pass

The reversal of the roller's main control lever operates in a manner already described to reverse the main motor. The operation of the screwdown motor causes the contacts 70 to engage contacts 110. A relay 111 is thereby energized, opening contacts 111c to deenergize a contactor 112 which inserts another portion of the rheostat 11r in circuit with the motor field 11f to accelerate the latter to the entering speed for the fifth pass. Further movement of the armature of relay 111 connects contacts 111a and 111d which operate the relay 49 to deenergize the contactor 50 and stop the screwdown motor 13. Contacts 111a and 111b are then connected to operate the relay 48. The operation of the relay 48, at the contacts 48b, opens the circuit for the down contactor 47 of the screwdown motor circuit and completes a circuit for the raising contactor 46. The latter is energized but the motor circuit is open at the contacts 50a of the relay 50, therefore, the screwdown motors do not operate yet to raise the top roll to its initial position.

Vertical roll screwdown adjustment and table starting for fifth pass

The reversal of the main control lever before the fifth pass also operates to set the vertical rolls in proper position. The main control lever completes the circuit for the contactor 51 which starts the motor 17 to move the roll housings inwardly and advance the contact 92. The contact 92 moves over contacts 93 and 97 without producing any effect and engages contacts 113 to energize a relay 114, a manual switch 114a in series therewith being assumed to be closed. The operation of the relay 114, at its contacts 114c, completes a circuit for the left-hand coil of relay 53. The operation of this relay deenergizes the forward contactor 51 and stops the screwdown motor 17. The relay 114 subsequently closes its contacts 114b to lock itself in energized position. The vertical rolls are thus adjusted for the fifth pass.

The reversal of the main control lever also causes the tables to start forward for the fifth pass in the manner already described, but only after the main and vertical rolls are adjusted and the main motor reversed and accelerated.

On entrance of the piece for the fifth pass, the main motor is accelerated, and on completion of the pass, the motor is decelerated, as explained above.

After the fifth pass has been completed, reversal of the main control lever 34 energizes contactor 52 to retract the vertical rolls for a subsequent pass of the same piece, or for the initial pass of the next piece. The vertical roll screwdown motor continues to operate in the reverse direction until the contact 92 engages contacts 95 to deenergize the contactor and stop the motor with the rolls in extreme retracted position. Contacts 115 determine the limit of closer adjustment of the main vertical rolls under manual control of the roller by controller 41. The vertical rolls may be maintained at their finishing gauge for a plurality of passes, if desired, being retracted on each reverse movement of the piece through the rolls. After the relays 98, 99 and 114 have all been operated, the contactors 51 and 52 are controlled directly by the main control lever. The number and sequence of inward adjustments of the vertical rolls is controlled by the switches, 98a, 99a and 114a. The finished piece is delivered to the run-out table by operating the rear extension table by manual controller 40.

*Restoration of initial setting of vertical rolls*

When the final pass is completed, the main control lever is in forward position. The relay 44 closes contacts 44b to complete the circuit of the contactor 50. The main screwdown motor 13 is thus operated to raise the top roll. The series relay 63 is thereby energized and a circuit is completed for the relay 94. This circuit includes the contact 63a of the relay 63, contact 64 of the control switch 35, contacts 41c of the controller 41, back contacts 116b of a relay 116 and the winding of relay 94. The energization of the relay 94 opens the circuits of the contactors 51 and 52 at contacts 94b and 94c and at contacts 94a completes a circuit for a relay 117. This circuit includes the contact 34f of the main control lever. The operation of the relay 117 at its contacts 117a completes a circuit for the reversing contactor 52 of the vertical roll screwdown motor 17 which thereupon retracts the vertical rolls from their innermost position at which they are set for the final pass, determined by contacts 115. The operation of the relay 63, of course, determines the operation of the relays 94 and 117 to reverse the vertical roll screwdown motors. When the contact 92 has been retracted to engage contacts 95, the reverse operation of the vertical roll screwdown motor 17 ceases.

Relay 117 at contacts 117b prepares a circuit for relay 100 which is completed when contact 92 bridges contacts 95. The operation of relay 100, at contacts 100a, energizes the relay 116 which opens its contacts 116b and closes its contacts 116a. The operation of relay 100 also opens the locking circuit for relays 98, 99 and 114 at its contacts 100b and all these relays are deenergized.

The opening of the contacts 116b deenergizes relay 94. The normal control circuits for the contactors 51 and 52 are thereby restored. The closing of the contacts 116a locks the relay 116 in through the main control lever as long as the latter remains in forward position. As soon as the lever is moved to normal position, the relay 116 is deenergized. The deenergization of the relay 94, at contacts 94a, deenergizes relay 117, and closes contacts 94b and 94c. The deenergization of relay 117 also deenergizes relay 100.

The vertical rolls are now retracted to their maximum separation and the contact 92 bridges contacts 95 and the relay 53 has its armature in right-hand position. When the relay 53 moved to its right-hand position, the circuit for the contactor 51 controlled thereby was open at contacts 94c of the relay 94 but the closing of these contacts, as above described, completes the circuit for the contactor 51 while the control lever is in forward position, and causes the screwdown motor to advance until the contact 92 bridges contacts 93. The relay 98 then operates, as has already been described for relay 99 and 114, to close its contacts 98c and 98b to stop the screwdown motor 17 and lock itself in, the manual switch 98a being closed. The vertical rolls are thereby adjusted to proper position for the first pass of the next piece.

*Restoration of main screwdown to initial position*

The main screwdown motors under the conditions described are now operating to raise the top roll to its initial position. As the contact 70 moves away from contacts 110, relay 111 is deenergized. Contacts 111a and 111b are disconnected but nothing happens as the result because the relay 48 controlled thereby remains in the position to which it was previously operated, the left-hand position. The instantaneous connection of contacts 111a and 111d have no effect since the series relay 63 is energized and contact 63b opened. The contacts 85c, 103c and 107c, which are all connected to 111d, are likewise isolated. The bridging of contacts 111c, however, completes the circuit for the contactor 112 which shunts a portion of the resistor 114 of the motor field circuit and thereby decelerates the main motor. As the contact 70 bridges contacts 106, nothing happens since the relay 107 is already locked up. When the contact 70 bridges contacts 104, however, relay 115 is energized to open the locking circuit for the relays 107 and 109. The latter are thereupon deenergized and the result is to energize contactor 108 to insert more resistance in the motor field circuit to further decelerate the speed of the latter, and to discontinue operation of the extension tables. The same sequence of events follows the passage of the contact 70 over contacts 102, 96, 84 and 82. The deenergization of relays 103 and 85 effected thereby deenergizes contactors 86 and 104 to insert resistors in the generator field circuit to further decelerate the main motor. When the top roll has been raised to its initial position, the contact 70 bridges contacts 71 to energize relay 72. Thereafter, the sequence of operations already described takes place to stop the screwdown motor, arrange its reversing circuit and otherwise prepare the mill for the first pass.

The ingot pusher control is rendered effective as soon as the relay 63 is energized to close its contact 63a when the screwdown starts the raising operation so that by the time the roll has been raised, an ingot has been placed on the front table, the main motor decelerated to proper entering speed for the first pass, the vertical rolls have been adjusted and the tables are ready to start as soon as the main control lever is moved to the forward position.

A brief resume of the operations of the various parts of the system will be given so as to make clear the operations which determine the various sequences. The ingot pusher operation is controlled by the raising operation of the main screwdown motors. While the screwdowns are raising the top roll of the mill, the pusher is placing an ingot on the front table.

The table motors are started by the main control lever but operation of the table motors is precluded until the vertical rolls have been adjusted properly, the main motor reversed, if necessary, and accelerated, and the main screwdown adjusted. The starting of the main screwdown motor on completion of a pass stops the tables. The main motor is automatically accelerated by increased load current. It is reversed by the main control lever. Successive passes of the piece automatically cause the main screw-down motors to operate to lower the top roll.

The manipulator and vertical rolls are controlled directly by the main control lever and indirectly by the contacts set to provide various adjustments of the rolls.

*Manual control*

The foregoing description has been directed entirely to the automatic control system. I also provide means for manually controlling the various portions of the system. The ingot pusher, for example, may be controlled directly by the controller 39 for advance or reverse movement. The operation of the controller 39, of course, breaks the automatic control circuit at contacts 65 for advance movement of the pusher and the circuit for the reversing contactor 61 may likewise be opened if desired.

The main motor controller is indicated at 35. Movement of the control lever to the right first opens contacts 64, 73, 74, 75 and 81. Bridging of contacts 35a completes the circuit for the reversing contactor 47 of the main screwdown motor 13. Engagement of the contact 35b energizes the relay 49 to operate the main contactor 50 to complete the motor circuit. Reverse movement of the controller bridges contacts 35c to reverse the position of relay 49. Contacts 35d control contactor 46 and contact 35e controls contactor 50.

The manual controller 41 directly controls the contactors 51 and 52 for operating the vertical screwdown motor. The controller 36 likewise controls the table motors 19 and 29. Controllers 37 and 38 similarly provide manual control means for the front and rear extension tables. The controller 40 is the manual controller for the run-out table but also serves to control the extension table motor 31. The piece may thus be delivered after rolling to shears or other apparatus. Operation of the controller 40 suspends automatic operation of the motor 31 by energizing a relay 118. Operation of the manual controller 38 produces the same effect by opening its contacts. A manual controller similar to that shown at 40 may be employed for controlling the front approach table motor 27, if used.

It will be apparent from the foregoing description that I have provided a control system for rolling mills which is almost entirely automatic. Such system, obviously, increases the possible rolling speed and, furthermore, insures that the proper sequence of operations will be carried out at all times. All that is required of the roller is the reversal of his main control lever, as long as normal conditions obtain. The auxiliary manual controllers, however, permit the roller to interrupt the automatic sequence at any time and control subsequent operations in accordance with the necessities of the case. By increasing the rolling speed, the amount of reduction which can be made with a single heating of the material is increased. The various parts of the system may be set for any desired conditions and such conditions will be maintained constant until further adjustments are made. The system is exceedingly flexible since the number of passes, as well as the reductions for each pass, may be varied widely. In case it is desired to eliminate certain intermediate passes, cut-out switches such as those shown at 98a, 99a and 114a may be provided in the circuits of the relays determining the settings of the rolls for the various passes.

By using extension tables in addition to the regular front and rear tables, power consumption and depreciation of apparatus is reduced, since the extension tables are operated only during that portion of the reducing cycle in which the piece has been elongated to a considerable fraction of its final length.

The system disclosed is applicable not only to a reversing two-high mill, as explained herein, but is also applicable to other types of mill. In a three-high mill, for example, it would be necessary to raise and lower the front and rear tables adjacent the rolls instead of reversing the main driving motor but the equipment described herein may be used just as readily for that purpose as for the reversing of the motor of a two-high mill.

An approach table in line with but beyond the front extension table may be utilized to place the material to be rolled on the front table, instead of the ingot pusher described. In such case, it will be easy to cause the approach table to start at the same time the front and rear tables start for the final pass of the preceding piece.

Although I have illustrated series relays for operation in response to motor currents, it is obvious that other types of relays may be used for this purpose, if desired. A voltage drop relay is a typical example of possible substitutes for the series relays shown. It will also be understood that the usual overload and other protective equipment will be incorporated in the complete system although such features have not been shown since they are already well known.

An important feature of the system is that each operation is controlled by the preceding operation in the normal sequence. A continuous interlocking of apparatus is thus effected so that, if for any reason, a certain operation does not take place, the sequence is arrested. An additional safety feature is thus incorporated in the system, which is absent from previous proposals to control rolling mills automatically by means of a continuously operating master controller.

Figure 8:
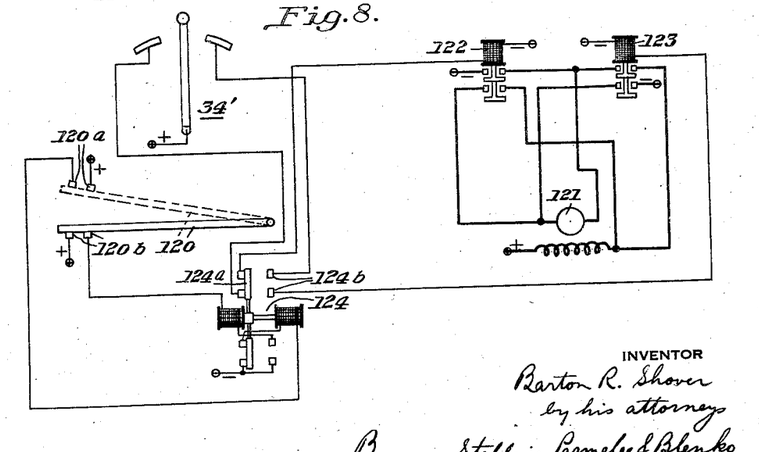
Figure 8 is a partial diagram of a control circuit which may be incorporated in the system instead of the reversing equipment for the main motor, in case it is desired to apply the invention to a three-high mill having tilting tables and a main motor which runs in one direction at all times.

If it is desired to apply the control system of my invention to a three-high mill, having tilting tables, the reversing equipment for the main motor may be omitted, since a three-high mill is always driven in the same direction, and the apparatus illustrated in Figure 8 utilized to control the tilting tables. In Figure 8 the main controller 34 is duplicated at 34'. One of the tilting tables is shown at 120. There is a table on each side of the mill, of course, and each table has a driving motor 121. Forward and reverse contactors 122 and 123 control the motor 121. A reversing relay 124 controls the contactors 122 and 123. The relay 124 is controlled by the movements of the table 120 so that when the table is horizontal, the relay is operated to a position such that the main controller, when operated, will cause the table to tilt. Likewise, when the table is tilted, the relay 124 is operated so that movement of the main controller will cause the lowering of the table.

As illustrated in the diagram, the table 120 is in horizontal position and the relay 124 is operated so that its contacts 124a are bridged. A circuit is thus prepared for the contactor 122 which is completed on counterclockwise movement of the controller 34'. On such movement of the controller, the motor 121 operates the table to the dotted position. Contacts 120a closed by the tilting of the table 120 energizes the right-hand winding of the relay 124 to open the circuit for the contactor 122 so that the tilting motor stops. At the same time, a circuit is prepared through contacts 124b for reversing the motor 121. This circuit is completed on clockwise movement of the main controller 34'. Lowering of the table 120 stops when contacts 120b are bridged to restore the relay 124 to the illustrated position.

Figure 4:
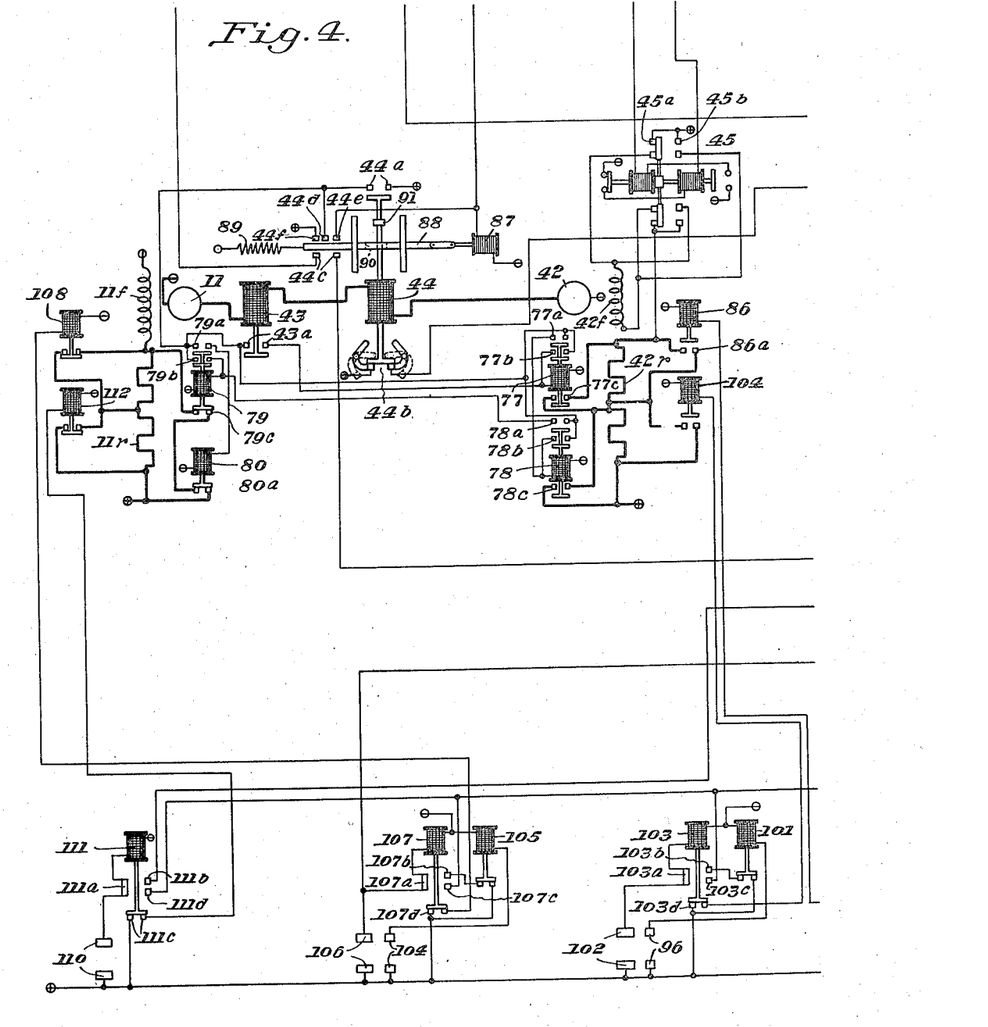
Figure 4 is a partial circuit diagram of the main motor and screwdown control.
Figure 5:
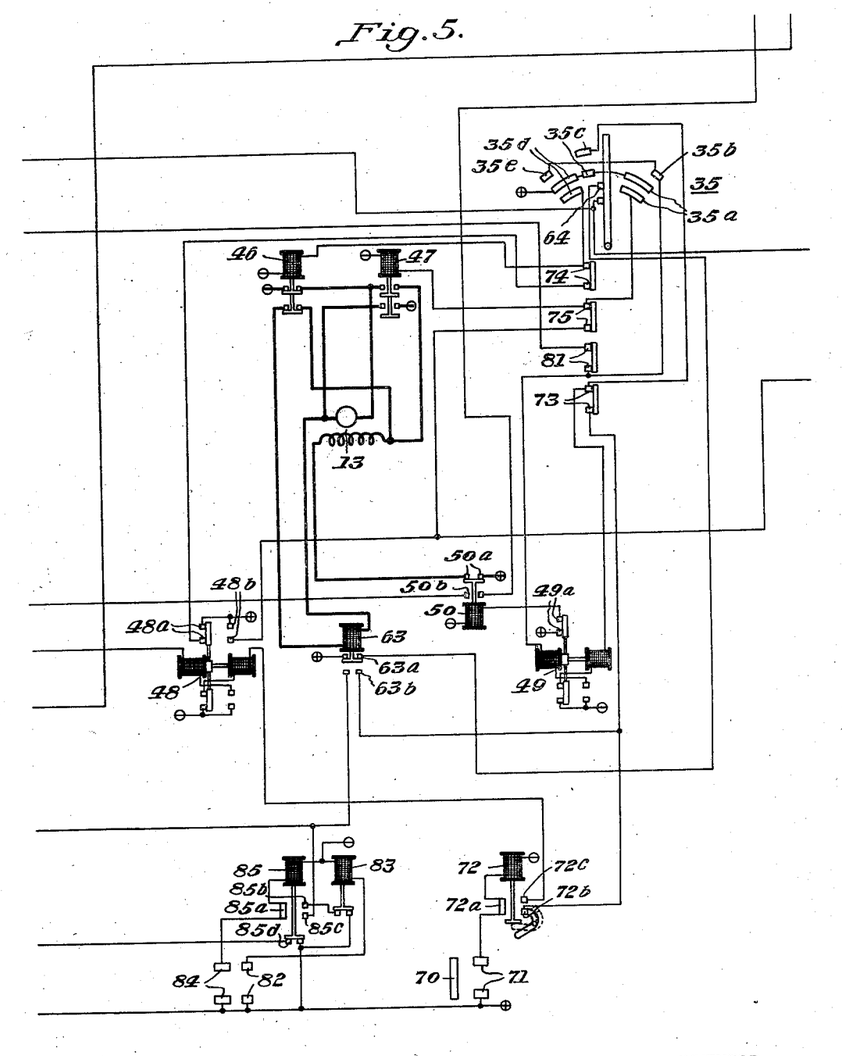
Figure 5 is a circuit diagram showing the rest of the control system for the main motor and screwdown.
Figure 6:
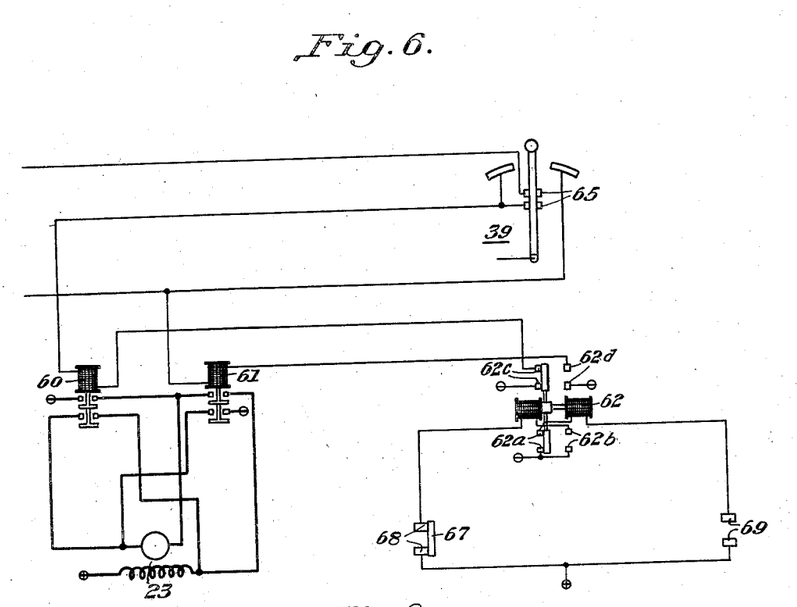
Figure 6 is a circuit diagram of the control mechanism for the ingot pusher.

It will be clear from the description of Figure 8 that the invention can readily be applied to a non-reversing three-high mill simply by controlling the tilting tables of such mill, as described, and omitting the equipment for reversing the main motor of the two-high mill which is shown in Figure 4.

Although I have illustrated and described herein but a single, present preferred embodiment of the invention, it will be apparent that numerous changes in the system as described may be made without departing from the spirit of the invention or the scope of the appended claims.

I claim:

1. In a rolling mill, a pair of main rolls, motor driven screwdowns for said rolls, front and rear tables for passing material through said rolls, vertical rolls, screwdowns therefor, a manipulator and an ingot pusher associated with said front table, means responsive to the operation of said main screwdown motor to raise the top roll of the mill, for actuating said ingot pusher, manual means for controlling said tables and said vertical roll screwdowns, and means for preventing operation of the tables until the main and vertical roll screwdowns have been adjusted.

2. In a rolling mill, the combination with a main roll driving motor, an adjustable top roll, screwdowns therefor and motors for driving said screwdowns, vertical rolls in said mill, screwdowns associated therewith, of means responsive to variation in main roll driving motor current on successive passes of material through the rolls for successively adjusting said top roll, and manually released automatic means for adjusting said vertical rolls for successive passes of material through the mill.

3. In a rolling mill, main rolls, a motor for driving said rolls, screwdowns for adjusting said rolls, vertical rolls, screwdowns therefor, front and rear tables for said mill, means for reversing said main motor, means responsive to passage of material through the rolls for adjusting the main roll screwdown, means controlled by said motor-reversing means for automatically adjusting said vertical screwdowns, and means responsive to the adjustment of said last mentioned screwdowns for starting said tables.

4. In a rolling mill, horizontal rolls, a driving motor therefor, and a master control lever for reversing said motor, vertical rolls associated with said mill, means controlled by said controller for retracting said vertical rolls fully on reversal of said main motor, and means for automatically setting the vertical rolls for increased reductions on successive operations of said main motor in the forward direction.

5. In a rolling mill, reducing rolls, front and rear tables for passing material through said rolls, front and rear extension tables, and means for automatically causing operation of said extension tables in synchronism with said first-mentioned tables, after a predetermined reduction of the material being rolled.

6. In a rolling mill, the combination with a motor for driving the mill, screwdowns for adjusting the roll set, means for passing material back and forth through the rolls, means responsive to the passage of material through the rolls for operating said screwdowns, of means operated by the movement of said screwdowns for increasing the speed of said driving motor.

7. In a rolling mill, horizontal rolls, a motor for driving said rolls and a controller for reversing said motor, a pair of vertical rolls, screwdowns for actuating said last mentioned rolls, a motor for operating the screwdowns, and means responsive to the operation of said main controller for operating said screwdown motor to shift said vertical rolls away from and toward the center line of the mill.

8. In a rolling mill, reducing rolls, a motor for driving said rolls, means for feeding material between the rolls, and means responsive to the completion of one pass of the material for increasing the speed of the motor to that required for entering the piece into the succeeding pass.

9. In a rolling mill, main rolls, a driving motor and screwdowns therefor, means responsive to the motor current for causing operation of the screwdowns, and means responsive to screwdown operation for accelerating the motor between successive passes.

10. In a rolling mill, the combination with reducing rolls, screwdowns therefor, front and rear tables for passing material therethrough, front and rear extension tables, means for reversing said rolls, means controlled by said reversing means for similarly controlling said front and rear tables and said extension tables, and means for rendering said extension tables inoperative until the piece being reduced attains a predetermined length.

11. In a rolling mill, the combination with reducing rolls, a reversing drive for said rolls, and front and rear tables for passing material back and forth through said rolls, of front and rear extension tables disposed in alignment with said front and rear tables at the outer ends thereof, separate motors for driving the tables and their extensions, and means for precluding operation of the extension tables during a portion of the reducing cycle.

12. In a rolling mill, the combination with reducing rolls, a motor for driving said rolls, tables for passing material back and forth between said rolls, motors for driving said tables, and means for synchronizing the speed of the table motors with that of said main roll motor, of extension tables, a motor therefor, and means for operating the extension tables in synchronism with the first mentioned tables only after the piece being worked has been elongated to a predetermined extent.

13. In a rolling mill, a main driving motor, means for delivering material to the mill for successive passes therethrough, and means responsive to the completion of said passes for increasing the speed of the motor for successive passes.

14. In a rolling mill, reducing rolls, a main driving motor and screwdowns therefor, means for delivering material to the mill for successive passes therethrough, means responsive to the completion of said passes for automatically adjusting the screwdowns, and means controlled by movement of the screwdowns for controlling the speed of said motor.

15. In a rolling mill, the combination with reducing rolls, a driving motor therefor and screwdowns for adjusting the rolls, of means for delivering material to the mill for successive passes therethrough, means responsive to the completion of said passes for controlling the speed of the motor, and means responsive to the commencement of said passes for temporarily accelerating the motor.

16. In a rolling mill, the combination with a pair of main rolls, a motor for driving said rolls, screwdowns for adjusting said rolls, and front and rear tables for passing material through the rolls, of a main controller for controlling said motor and said tables, means responsive to the passage of material through said rolls for operating the screwdowns, and means preventing operation of said tables prior to the completion of said screwdown adjustment.

17. In an automatic rolling mill, the combination with an adjustable top roll, screwdowns for adjusting said roll, motors for driving the screwdowns, an ingot-advancing means and a motor for driving the ingot-advancing means, of means actuated by reversing the operation of said screwdown motors to raise the top roll, said means being effective to cause the operation of said ingot-advancing means.

18. In a rolling mill, reducing rolls, screwdowns for adjusting said rolls, screwdown reversing means, a front table, and means for supplying a piece of material to said front table, and means actuated by said screwdown reversing means effective automatically to operate said means for supplying a piece of material to said front table.

19. In a control system for a rolling mill including a main driving motor, a reversing controller therefor, and an adjustable top roll having screwdowns, means responsive to the load on said main motor for automatically operating said screwdowns to lower said top roll, and a lock-out for said means, said lock-out being controlled by said controller.

20. In a rolling mill, a pair of reducing rolls, a reversible motor driving said rolls, a reversing controller for the motor, front and rear tables for feeding material between said rolls, a reversing motor driving said tables, manual means for reversing said first-mentioned motor, means in the circuit of said first-mentioned motor for reversing said tables, and lock-out means actuated by said controller for rendering said table reversing means ineffective.

21. The combination with a three-high mill having screwdowns and tilting conveyor tables associated therewith, of means responsive to the passage of material through the mill for adjusting the screwdowns, and manually controlled means for operating said conveyor tables, said tables also being controlled by said first mentioned means.

BARTON R. SHOVER.

CERTIFICATE OF CORRECTION.

Patent No. 1,994,290.  March 12, 1935.

BARTON R. SHOVER.

It is hereby certified that error appears in the printed specification of the above numbered patent requiring correction as follows: Page 4, second column, line 44, strike out the words "but this circuit has already been opened at" and insert instead the syllable and words energizes the relay 63 which, at its front; and that the said Letters Patent should be read with this correction therein that the same may conform to the record of the case in the Patent Office.

Signed and sealed this 23rd day of April, A. D. 1935.

Leslie Frazer (Seal)  Acting Commissioner of Patents.